US008578456B2

(12) United States Patent
Lindholm et al.

(10) Patent No.: US 8,578,456 B2
(45) Date of Patent: Nov. 5, 2013

(54) AUTHENTICATION IN AN IP MULTIMEDIA SUBSYSTEM NETWORK WHERE AN IN-USE LINE IDENTIFIER (LID) DOES NOT MATCH A REGISTERED LID

(75) Inventors: Fredrik Lindholm, Älvsjö (SE); David Castellanos, Madrid (ES); John Michael Walker, Den Haag (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 336 days.

(21) Appl. No.: 12/515,652

(22) PCT Filed: Nov. 24, 2006
(Under 37 CFR 1.47)

(86) PCT No.: PCT/EP2006/068912
§ 371 (c)(1),
(2), (4) Date: Oct. 26, 2010

(87) PCT Pub. No.: WO2008/061570
PCT Pub. Date: May 29, 2008

(65) Prior Publication Data
US 2011/0093933 A1    Apr. 21, 2011

(51) Int. Cl.
*G06F 7/04* (2006.01)
*G06F 15/16* (2006.01)
*G06F 17/30* (2006.01)
*H04L 29/06* (2006.01)
*H04L 9/32* (2006.01)

(52) U.S. Cl.
USPC ............................................. 726/5; 713/168

(58) Field of Classification Search
USPC ....................................... 713/201, 168; 726/5
See application file for complete search history.

(56) References Cited

U.S. PATENT DOCUMENTS

| | | | |
|---|---|---|---|
| 5,974,133 A * | 10/1999 | Fleischer et al. | 379/230 |
| 6,983,381 B2 * | 1/2006 | Jerdonek | 726/5 |
| 7,539,862 B2 * | 5/2009 | Edgett et al. | 713/168 |
| 7,822,407 B2 * | 10/2010 | Huang et al. | 455/411 |
| 7,836,487 B2 * | 11/2010 | Walker Pina et al. | 726/3 |
| 8,270,418 B2 * | 9/2012 | Vikberg et al. | 370/401 |
| 2005/0097363 A1 * | 5/2005 | Bajko et al. | 713/201 |
| 2007/0113086 A1 | 5/2007 | Huang et al. | |
| 2007/0136792 A1 * | 6/2007 | Ting et al. | 726/5 |
| 2008/0005785 A1 * | 1/2008 | Leinonen et al. | 726/3 |

(Continued)

OTHER PUBLICATIONS

ETSI TS 183 033 v1.1.1. Telecommunications and Internet converged Services and Protocols for Advanced Networking (TISPAN); IP Multimedia; Diameter based protocol for the interfaces between the Call Session Control Function and the User Profile Server Function/Subscription Locator Function; Signalling flows and protocol details. [3GPP TS 29.228 V6.8.0 and 3GPP TS 29.229 V6.6.0, modified]. European Telecommunications Standards Institute. Apr. 30, 2006.

*Primary Examiner* — Carolyn B Kosowski (57) ABSTRACT

A method and telecommunication node for authenticating with an IP Multimedia Subsystem (IMS) network, a nomadic user in an access network. The node receives from the access network, an access identifier defining a mobile terminal's physical location. In response, the node retrieves from a database, a registered access identifier associated with the user and determines whether the received identifier matches the registered identifier. If the identifiers match, the node authenticates the user in the IMS network. If the identifiers do not match, the node performs an alternate authentication method.

12 Claims, 6 Drawing Sheets

(56) References Cited

U.S. PATENT DOCUMENTS

2008/0155658 A1* 6/2008 Leinonen et al. .............. 726/4
2008/0209532 A1* 8/2008 Wen et al. ..................... 726/9
2009/0154671 A1* 6/2009 Weiss et al. ............... 379/93.02
2011/0173687 A1* 7/2011 Willars et al. .................. 726/7
2011/0277025 A1* 11/2011 Counterman ................... 726/8

* cited by examiner

AUTHENTICATION IN AN IP MULTIMEDIA SUBSYSTEM NETWORK WHERE AN IN-USE LINE IDENTIFIER (LID) DOES NOT MATCH A REGISTERED LID

TECHNICAL FIELD

The invention relates to the field of authentication of a user in a communications network.

BACKGROUND

IP Multimedia (IPMM) is an example of a service that provides a dynamic combination of voice, video, messaging, data, etc, within the same session. By growing the numbers of basic applications and the media that it is possible to combine, the number of services offered to the end users will grow, and the inter-personal communication experience will be enriched. This will lead to a new generation of personalised, rich multimedia communication services, e.g. peer-to-peer multimedia communication, IPTV etc.

These services can be based on the IP Multimedia Subsystem (IMS) architecture, which is the technology defined by the Third Generation Partnership Project (3GPP) to provide IP Multimedia services over mobile communication networks (3GPP TS 22.228, TS 23.228, TS 24.229, TS 29.228, TS 29.229, TS 29.328 and TS 29.329 Releases 5 to 7).

Figure 1:
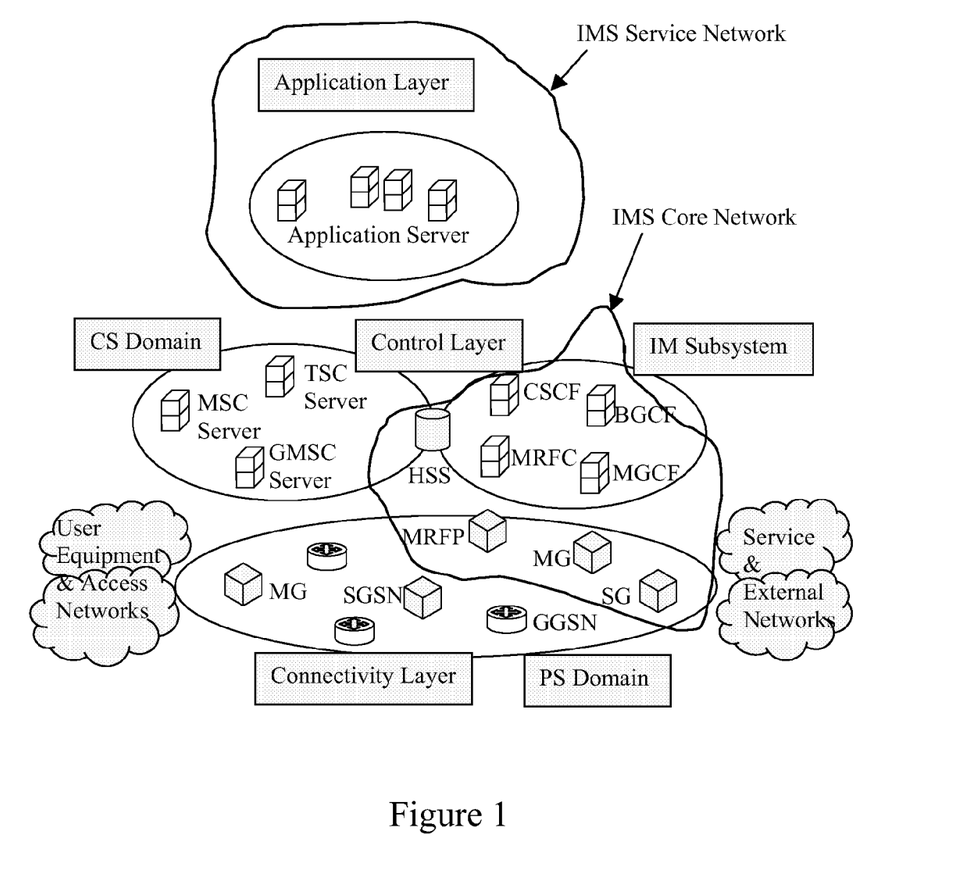
FIG. 1 illustrates schematically how the IMS fits into the mobile network architecture in the case of a 3GPP PS access domain.

The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. FIG. 1 illustrates schematically how the IMS fits into the mobile network architecture in the case of a 3GPP PS access domain.

When a user wishes to access any network from a fixed line, the user may first be authenticated in an access network using a Network Attachment Sub-System (NASS) (ETSI TS 282 004 v1.1.1). The NASS allocates an IP address to the fixed line in use, and authenticates and authorises the user. The NASS can also be used to configure preferences in the access network, depending on a user profile stored by the NASS.

When authenticating the end user in the access network, the user's terminal sends an in-use Line Identifier (LID) associated with the fixed line that the terminal is using to access the network. The LID is forwarded to a NASS entity called a Connectivity Session Location and Repository Functions (CLF). The CLF then associates the user's LID with the user's assigned IP address.

Figure 2:
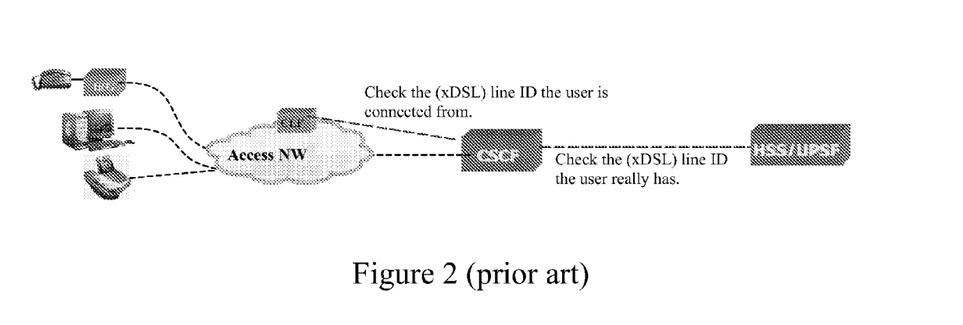
FIG. 2 illustrates schematically authentication of a user in an access network using Network Attachment Sub-System IMS bundled authentication.

For users accessing an IMS network from a fixed line, ETSI TS 183 033 TISPAN defines a method of authentication for IMS users. This method is known as NASS-IMS bundled (NAB). The NAB method allows the IMS layer to re-use existing Network Attachment Sub-System (NASS) authentication status, as illustrated in FIG. 2. The IMS network performs a Line ID check, and if it is successful then the TISPAN IMS network trusts the access network authentication status and marks the user as authenticated.

In more detail, upon IMS-SIP registration, a Proxy-Call Session Control Function (P-CSCF) in the IMS network queries the CLF in the access network to retrieve the in-use LID and the IP address assigned to the in-use line. The P-CSCF uses the retrieved IP address in the SIP Register as a query key. The in-use LID is inserted into a SIP Register message using the P-Access-Network-Info (PANI) parameter of the SIP Register message. The REGISTER message containing the LID value is then sent to a Serving-Call Session Control Function (S-CSCF). When the S-CSCF performs a Multimedia Authentication Request (MAR) operation, it may not know the authentication scheme in use, and so the S-CSCF sets the Authentication-scheme Attribute Value Pair (AVP) in the MAR to "unknown". The MAR is sent to a Home Subscriber Server (HSS), which selects an authentication scheme based on the subscribed authentication method. The user's IMS Private Identity (IMPI) and IMS Public Identity (IMPU), that are used in the SIP Registration procedure, are included in the MAR sent towards the HSS.

The HSS retrieves a registered Line Identifier (LID') from a database. LID' is a registered line identifier that is associated with the user and stored in the user's profile.

When the HSS responds to the S-CSCF with a Multimedia Authentication answer, the HSS sets the Authentication-scheme AVP to "NASS Bundled", and includes LID' in the Multimedia Authentication answer.

Figure 3:
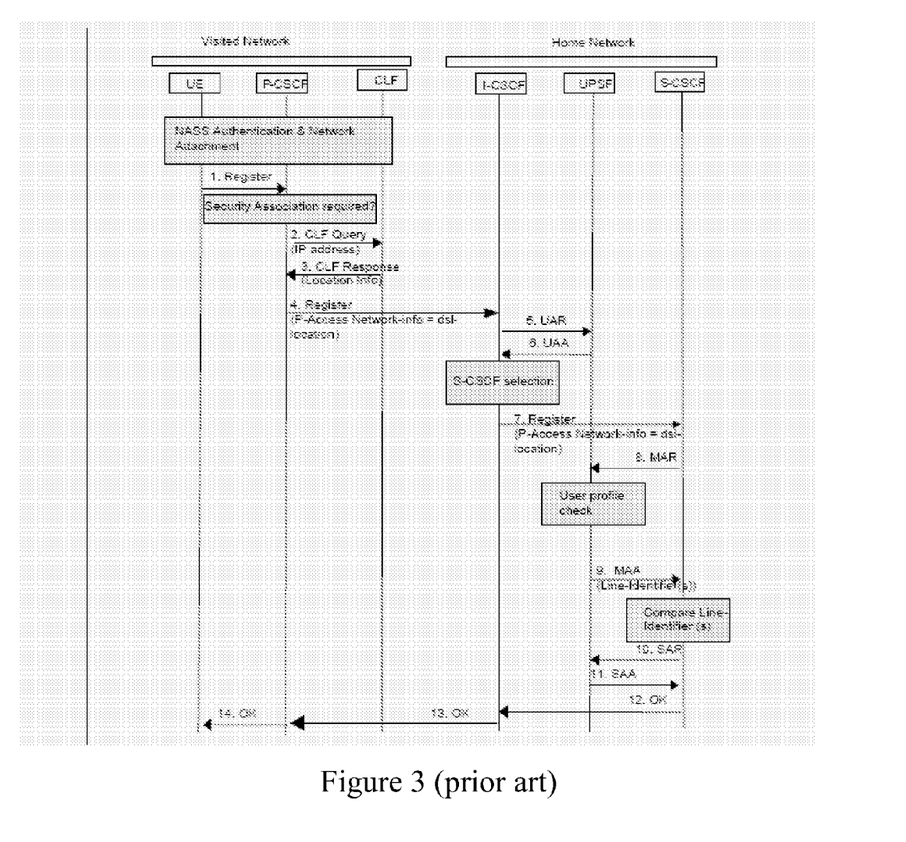
FIG. 3 illustrates schematically a signalling sequence to authenticate a user in an access network using Network Attachment Sub-System IMS bundled authentication.

The S-CSCF compares LID' returned by the HSS with LID received from the accessing terminal. If LID matches LID', then S-CSCF sends a SAR message to the HSS. In this case, the user is considered successfully authenticated. The signalling sequence described above is illustrated in FIG. 3.

A problem with this solution is that it relies upon a correct association between the in-use Line Identifier (LID) value obtained from the CLF in the NASS, and registered Line Identifier LID' stored in the user's IMS profile.

Figure 4:
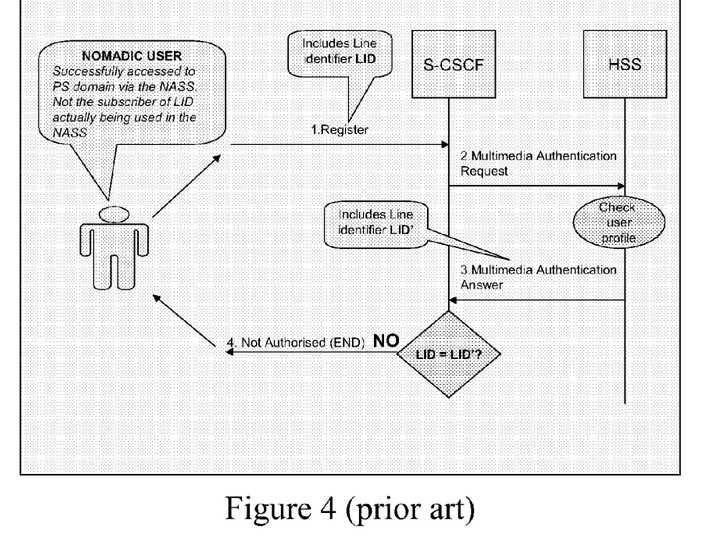
FIG. 4 illustrates schematically the process of a nomadic user attempting to access an IMS network using Network Attachment Sub-System IMS bundled authentication.

Referring to the example scenario illustrated in FIG. 4, a nomadic user makes use of a third party's fixed-line broadband connection (for example, the user may be a guest the third party's home and make use of the available DSL line or Fiber line). IMS registration relies on the registering user having an IMS identity, which is typically stored on a card. In order to register with an IMS network, the user must send their identity to the network. The nomadic user attaches to a fixed line connection in any one of a number of standard ways. For example, the nomadic could plug a 3G-enabled laptop into a modem, make use of an available WLAN router, or insert their smart-card/SIM-card/ISIM-card into local equipment. If authentication in the conventional NASS via the User Access Authorisation Function/Profile Database Function (UAAF/PDBF) is successful, the user can use the fixed-line broadband connection regardless of the user's IMS credentials. However, if the nomadic user then decides to register with an IMS network to make use of IMS services, the user sends its IMS Private Identity (IMPI) and IMS Public Identity (IMPU) to the IMS S-CSCF, according to 3GPP TS 24.229 V7.4.0 (2006-06). The S-CSCF sends the following information to the UPSF/HSS as part of the registration:
  Authentication-scheme AVP set to "unknown"
  User's IMPI and IMPU If the user attempting IMS registration has a NASS-Bundled authentication scheme enabled in his subscription, then the HSS/UPSF will return the user's registered LID' back to the S-CSCF. However, the in-use LID differs from LID' stored in the user profile, as the user is not using a fixed-line connection registered to that user. As a consequence, the S-CSCF cannot authenticate the user and notifies the user terminal accordingly. Further attempts by the terminal to register with the IMS network may be interpreted by the IMS network as a Denial of Service attack or fraud attempt, resulting in the IMS end user being blacklisted or blocked. This situation is not solved by ETSI TS 183 033 TISPAN.

This problem can occur whenever an IMS user (for which NAB authentication is enabled) makes use of a fixed line connection with an in-use LID value that is different from the registered LID' value associated with the user in their IMS profile and stored in the HSS, for example, whenever an IMS user makes use of a visited WLAN/Wimax access point (which ultimately connects to a network using a fixed line) as a guest user.

SUMMARY

It is desirable to allow a nomadic user to be authenticated in an IMS network using NASS-Bundled authentication where the nomadic user's LID value does not match the LID' value associated with the user in their IMS profile.

According to a first aspect of the invention, there is provided a method of authenticating a user in an IP Multimedia Subsystem network, the method comprising:
- receiving from an access network an access identifier defining a terminal's physical location;
- retrieving from a database a registered access identifier associated with the user; and
- determining if the received access identifier matches the registered access identifier, and if so then authenticating the user in the IMS network, and if not then performing an alternative authentication method.

It is preferred that the alternative authentication method is selected from a list of authentication methods contained in a user profile stored by the IP Multimedia Subsystem network. The selection may be made on the basis of criteria selected from user preference; operator preference; network domain; security preference; and access technology.

It is preferred that the access identifier received from the access network is an in-use Line Identifier, that defines the line through which the terminal connects. However, other types of identifier that define a line may be used, including a Service Set Identifier.

In a preferred embodiment, the method comprises the steps of, prior to receiving the access identifier, receiving in the access network an in-use Line Identifier. The user is then authenticated in the access network. A pre-registered Line Identifier is retrieved from an access network database and it is determined whether the pre-registered Line Identifier matches the in-use Line Identifier. If not then a Visiting Line Identifier is generated, which is used as the received Line Identifier in the IMS network.

The alternative authentication method may comprise determining whether the Line Identifier received from the access network is a Visiting Line Identifier, and if so, authenticating the user.

The Line Identifier received from the access network may be a concatenated line identifier comprising both the Visiting Line Identifier and the in-use Line Identifier.

Where a concatenated Line Identifier is used, the method may further comprise deconcatenating the concatenated Line Identifier into the Visiting Line Identifier and the in-use Line Identifier; and using the in-use Line Identifier for any one of:
- authorizing the user in the network;
- determining the geographical location of the user;
- triggering Initial Filter Criteria relating to a user session; and
- elaborating statistics relating to users of the IP Multimedia Subsystem network using a Visiting Line Identifier.

The method may further comprise retrieving from a database a user profile of an IP Multimedia Subsystem user associated with the in-use Line Identifier. In this way, a user profile of the user associated with the in-use Line Identifier can be obtained which can be used to determine whether or not to allow registration of the registering user with the IMS network.

The access network may be accessed via an http proxy.

According to a second aspect of the invention, there is provided a node for use in a IP Multimedia Subsystem network, the node comprising:
- a receiver for receiving from an access network a Line Identifier associated with a user terminal;
- retrieving means for retrieving from a database a registered Line Identifier associated with the user;
- authentication means for determining if the received Line Identifier matches the retrieved Line Identifier and if so then authenticating the user in the IP Multimedia Subsystem network, and if not then performing an alternative authentication method.

The node may be a Call Session Control Function

According to a third aspect of the invention, there is provided a node for use in an access network, the node comprising:
- a receiver for receiving a Line Identifier associated with a user terminal;
- retrieving means for retrieving from a database a pre-registered Line Identifier associated with the user;
- determining means for determining if the received Line Identifier matches the retrieved Line Identifier; and
- generating means for, if it is determined that the received Line Identifier does not match the pre-registered Line Identifier, generating a Visiting Line Identifier.

The node may be a Connectivity Session Location and Repository Function.

DETAILED DESCRIPTION

Figure 5:
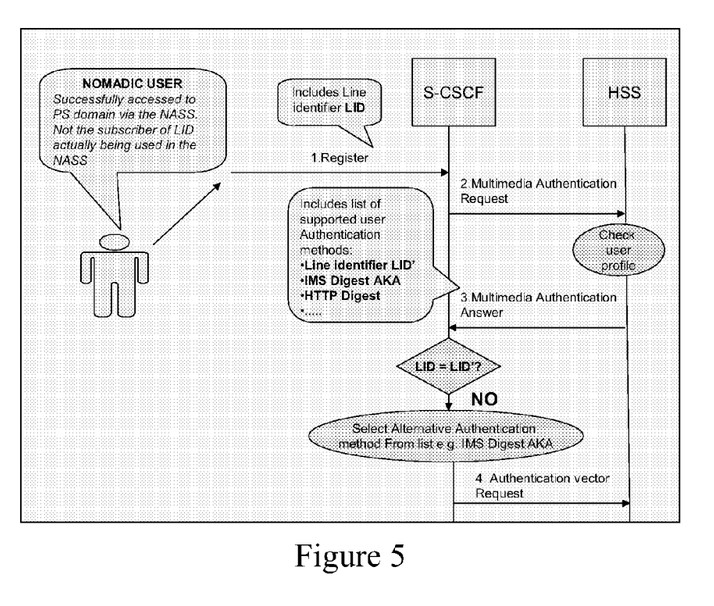
FIG. 5 illustrates schematically an alternative authentication method for a nomadic user where the user's Line Identifier does not match the Line Identifier stored in the user's profile.

One way to authenticate a user in a fixed line access network using Network Attachment Sub-System-Bundled (NAB) authentication is to allow a Serving-Call Session Control Function (S-CSCF) to perform an alternative authentication procedure where a re-registered LID' does not match an in-use LID. Referring to FIG. 5, when a nomadic user attempts SIP registration, the Serving-Call Session Control Function (S-CSCF) retrieves the user profile from the Home Subscriber Server (HSS)/UPSF. The user's profile includes one or more pre-registered Line Identifier values LID' stored in their IMS profile. The user profile may also include a list of allowed user authentication methods. In the case of a nomadic user, when the retrieved LID' differs from network received LID (LID'< >LID) then the S-CSCF selects an alternative user authentication method from the list in the user profile previously provided by the HSS/UPSF. For example, if IMS AKA (as defined in 3GPP TS 33.203) is included in the list of allowable authentication procedures, then the S-CSCF sends a Cx Authentication Vector request to the HSS/UPSF and a SIP Not-Authorized-Authentication Challenge request to the terminal.

The S-CSCF may select an alternative authentication procedure based on a set of variable criteria, for example user preference, operator preference, NASS domain in use, degree of required security and trust, access technology in use, and so on. However, it is not possible to use the solution described above for the case when an IMS end-user only has NASS-bundled authentication enabled in the list, or if the terminal only supports NASS-bundled.

In a second embodiment, an additional parameter called Visiting Line Identifier is introduced in the Network Attachment Sub-System (NASS) signalling. This parameter can be used as an alternative authentication procedure by an S-CSCF during subsequent IMS registration. When a terminal has been successfully authenticated in the NASS, the line used by the terminal is assigned an IP address. A subscriber authentication entity and/or subscriber database called the User Access Authorisation Function/Profile Database Function (UAAF/PDBF) stores a pre-registered line identifier LID', associated with the user's NASS profile. An association between the assigned IP address and the in-use LID (also called a Logical Access Id) is registered in a Connectivity Session Location and Repository Function (CLF) in the NASS. The nomadic user has a profile stored at the PDBF, the profile including LID'. The LID'value stored at the UAAF/PDBF is sent to the CLF, along with the in-use LID value and any other profiles associated with the user. When the user is nomadic, the Line Identifier value LID' differs from the in-use Line Identifier LID. In this case, the CLF tags LID' as a Visiting LID and stores this value along with the rest of the user's access session information.

Figure 6:
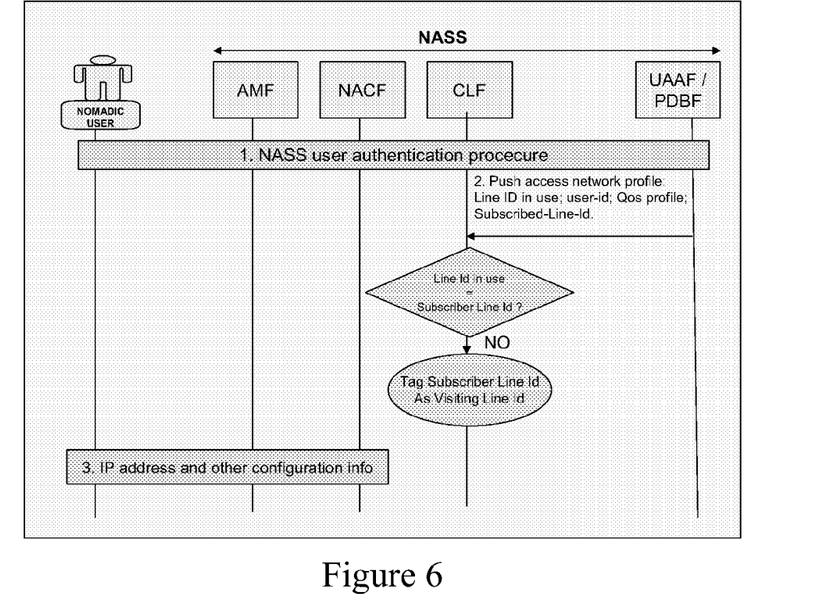
FIG. 6 illustrates schematically the process of tagging a Line Identifier as a visiting Line Identifier.

FIG. 6 illustrates the process of tagging a Line Identifier as a Visiting Line Identifier. FIG. 6 is based on TISPAN NASS sequence flows (available in chapter 7 of ETSI TS 282 004 v1.1.1) although it amends the sequence flows with the addition of the Visiting Line Identifier currently not considered by the NASS standard. Step 2 of FIG. 6 includes the value LID' sent by the UAAF/PDBF to the CLF. This parameter may or may not take the same value as the current optional parameter Subscriber-Id also sent by the UAAF/PDBF to the CLF and described in ETSI TS 282 004 v1.1.1.

Figure 7:
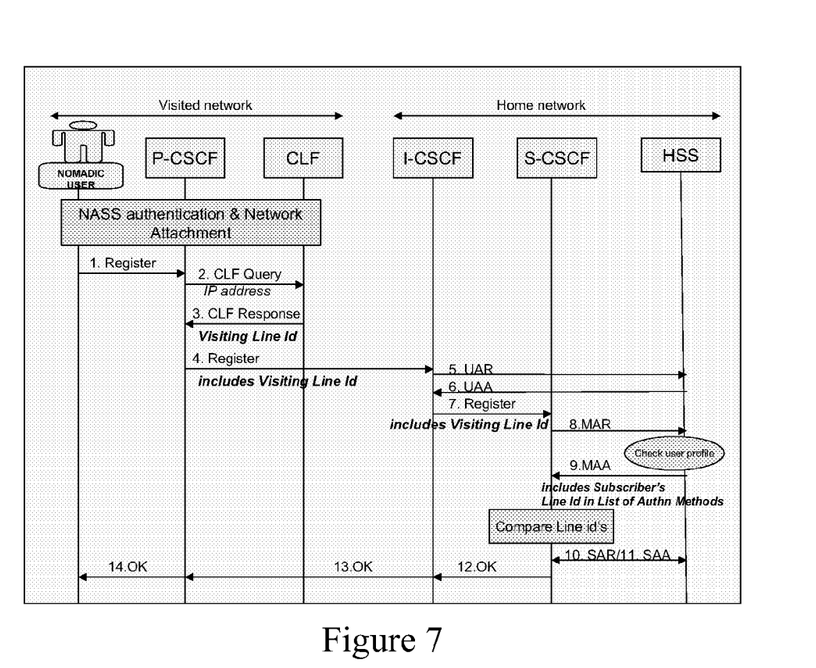
FIG. 7 illustrates schematically Network Attachment Sub-System IMS bundled authentication based on a Visiting Line Identifier.

As illustrated in FIG. 7, when the user has been successfully authenticated in the NASS, and subsequently attempts to initiate an IMS SIP Register procedure, the Proxy-Call Session Control Function (P-CSCF) queries the CLF in the NASS for the in-use LID. If LID' has not been tagged at the CLF as a Visiting Line Identifier, then the CLF returns the in-use LID value to the P-CSCF. During SIP registration, the LID value returned to the P-CSCF is sent to the S-CSCF where a comparison is made between LID and the pre-registered LID' stored in the user's IMS profile. Assuming that LID and LID' match, the user is authenticated in the IMS network.

If LID' has been tagged at the CLF as a Visiting Line Identifier, then the CLF returns the Visiting LID value to the P-CSCF rather than the in-use LID. The use of a Visiting LID tag can be included in the list of user supported authentication methods (returned by the HSS to the S-CSCF) in the user profile, as described above. The IMS network trusts the NASS network and authenticates the user in the IMS network even though LID' and LID do not match.

Figure 8:
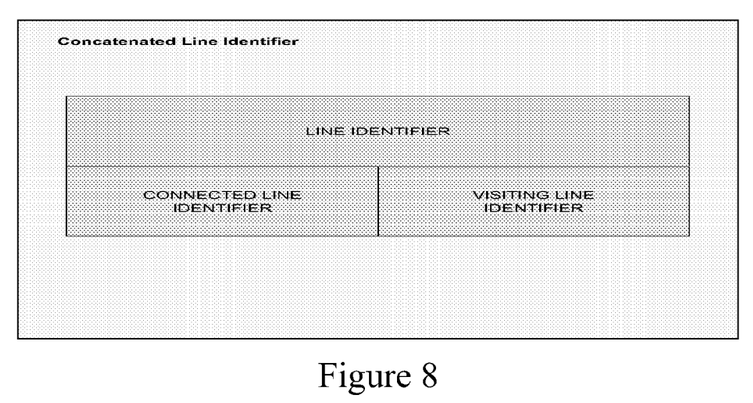
FIG. 8 illustrates schematically a concatenated Line Identifier comprising a connected Line Identifier and a Visiting Line Identifier.

A variation of the second embodiment is to define the LID parameter as a concatenation of line identifiers as depicted in FIG. 8. The Line Identifier is defined as a concatenation of the in-use LID and the Visiting LID. The concatenation is performed in the CLF since the CLF receives both values during the user's authentication procedure in the NASS. When a user attempts to register with an IMS network as described above, the CLF returns the concatenated line identifier to the P-CSCF, which sends it to the S-CSCF. The S-CSCF de-concatenates the line identifier into the in-use LID value and the Visiting LID value. The S-CSCF uses the Visiting LID to authenticate the IMS end user via NASS-Bundled authentication as described above. The S-CSCF may also use the in-use LID for the following purposes:

As authorization criteria to check if the authenticated nomadic user is allowed to make use of the in-use line for IMS. This can be based on user profile criteria of the subscriber, operator criteria, network resource usage criteria and any combination of these.

As a means to physically locate an IMS user.

As a means to obtain statistics regarding the number of IMS users tagged with a Visiting LID that are making use of a given in-use LID, their behaviour patterns, generated IMS traffic per Visiting LID vs. all traffic on the in-use LID, and so on. This function can be used to prevent possible fraud attempts.

As a means to trigger specific IMS services via Initial Filter Criteria that consider both the value of the in-use Line Identifier as well as the value of the Visiting LID.

The S-CSCF may also send the concatenated line identifier to the HSS (once the user is authenticated in the IMS network) so that the HSS/UPSF may offer this value over the Sh interface to application servers.

When the S-CSCF receives a Concatenated Line-identifier, it de-concatenates said identifier into an in-use LID and a Visiting LID, as described above. The Visiting LID pertains to the IMS user that is registering with the IMS network, and the in-use LID pertains to a second user who "owns" the in-use LID. The user's profile information is obtained from the HSS during the IMS Registration procedure. To obtain profile information related to the "owner" of the in-use LID, the S-CSCF queries a profile database using the in-use LID value as a query key. The S-CSCF resolves the network domain to which the in-use LID belongs, which also includes a number portability check. The querying and resolving operations can be done via ENUM/DNS (Domain Name System) or signalling S7 mechanisms. Once this is performed, the S-CSCF receives a SIP URI or TEL URI that is related to the in-use LID and that can be used to correctly route the query to the domain of the subscriber's database. By obtaining profile information of the user who "owns" the in-use LID, the S-CSCF can make decisions on whether to authorise the registering IMS user or not, depending on the information contained in the obtained user profile.

Figure 9:
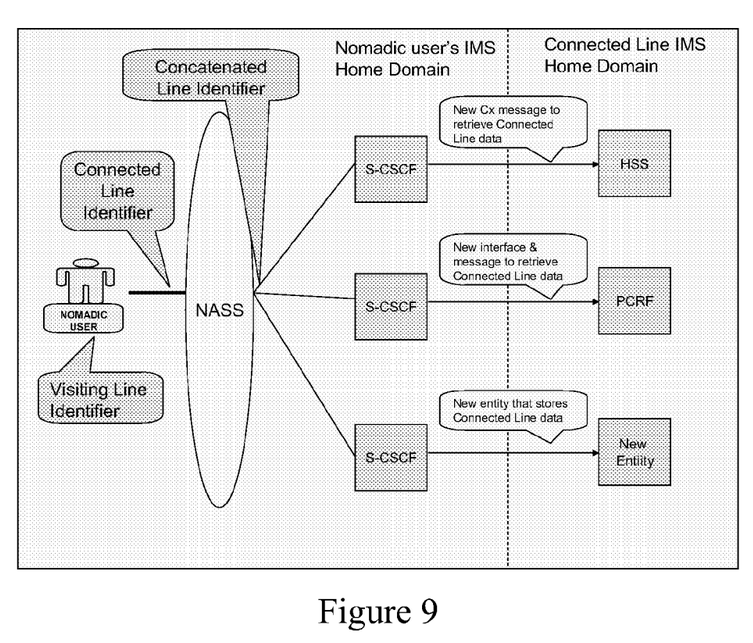
FIG. 9 illustrates schematically the ways in which a Serving-Session Control Function obtains profile information related to a Connected Line Identifier.

The S-CSCF can perform one of the following actions, as illustrated in FIG. 9:

Issue a new Diameter/Cx request to the HSS/UPSF of the Connected Line Identifier with the value as user-id. Note that in this case the S-CSCF and the HSS may belong to different domains so the viability of this case depends on the degree of trust and security between the two domains. In order to avoid sending the entire user profile from the HSS/UPSF in one domain to the S-CSCF in another domain, only data related to the issue of nomadic users making use of a given in-use LID is returned by the HSS to the S-CSCF. This data can then be used by the S-CSCF to take decisions and enforce policies on the Visiting Line Identifier.

Implement a new interface between the S-CSCF and a Policy and Charging Rules Function (PCRF). This interface is based on (but not the same as) Diamter/Gx. In this instance, there is also provided a PCRF<–>PCRF interface between domains to transfer information to the S-CSCF.

Implement the data related to the issue of nomadic users making use of an in-use Line in a specific server. The interface between the S-CSCF and another entity able to provide information relating to the user could be any protocol (SIP, LDAP, Diameter, etc).

The most complicated case has been depicted in FIG. 9. The simplest case is when the Nomadic User's IMS home domain is the same as the Connected Line Identifier's IMS Home Domain.

User clients connecting to an IMS network over a TISPAN fixed access broadband network will not only be provided with a SIP interface. It is likely that this kind of client also has an http interface such as a Ut interface, used typically for self administration and provisioning of user data to different applications available through the TISPAN-IMS connection.

Figure 10:
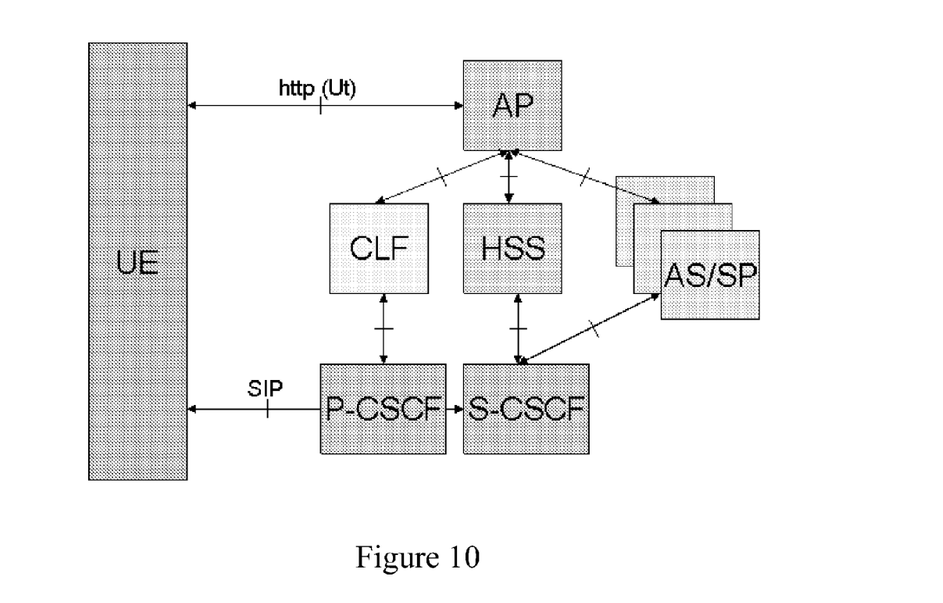
FIG. 10 illustrates schematically a NASS-IMS and NASS-Ut Bundled Authentication Architecture.
Figure 11:
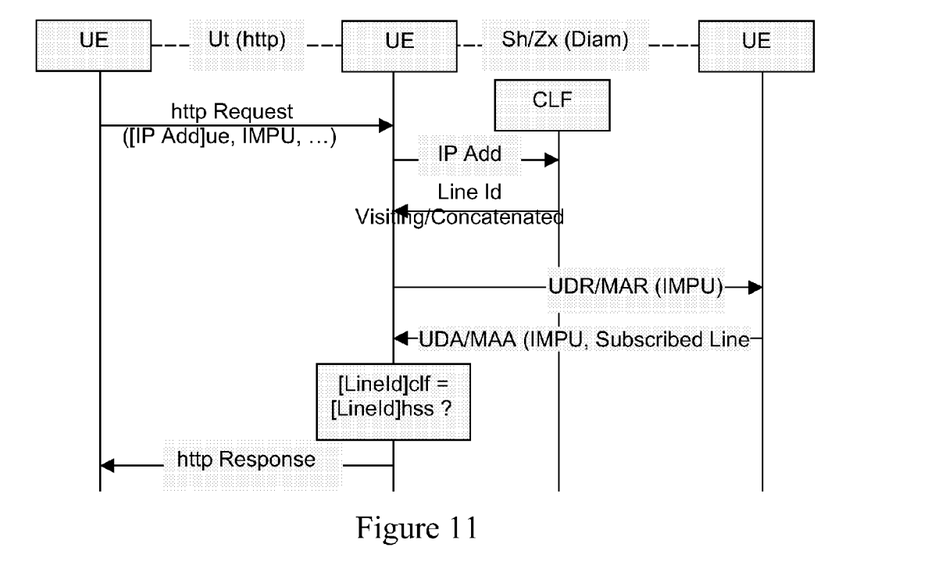
FIG. 11 illustrates schematically signalling for NASS-Ut Bundled Authentication.

User access to a network over Ut is typically arranged through an http proxy. The proxy interfaces a number of Application Servers or Service Providers, and is able to execute some functions on behalf of them, including user authentication. As an example, the Presence and Group Management enabler as defined by OMA and re-used in the 3GPP Presence architecture over IMS, uses the so called Aggregation Proxy, which authenticates user access to XDM servers. In a 3GPP (mobile) environment, the Aggregation or Authentication proxy authenticates users using mechanisms defined in early IMS, GAA/GBA or proprietary interfaces like Ericsson's Zx. In an alternative embodiment of the invention, a user has access to an application server via an http interface (e.g. Ut) from a TISPAN fixed broadband access network, as illustrated in FIGS. 10 and 11. The user is authenticated making use of the enhanced NASS-IMS bundled mechanism described above.

Once NASS authentication has occurred, the IMS authentication signalling sequence is as follows:

The user terminal initiates an http request including its IP Address and a user identity (e.g. IMPU).

The http-proxy (AP in FIGS. 10 and 11) performs a CLF query using the received terminal IP Address in order to receive a Line Identifier. The LID information returned by the CLF to the AP may be the in-use LID or a Visiting LID, depending on whether or not the user is nomadic.

The AP requests from the HSS the pre-registered LID' information for that particular user IMPU. The AP can re use either the Sh or Zx interfaces and messages. Zx needs to be updated so the HSS provides the Subscribed Line ID in the response to the AP The AP compares the LID' retrieved from the HSS with the LID provided by the NASS via the CLF.

In the case where no http proxy exists in the system, every AS/SP implements interfaces towards the CLF and the HSS to execute the procedures of NASS-Ut Bundled Authentication.

The invention described above provides a mechanism for nomadic users in the TISPAN access layer to also make use of NASS-bundled authentication in the TISPAN IMS layer, and avoids NASS-bundled authentication failing due to a mismatch between the in-use LID and the nomadic subscriber's pre-registered LID'. The TISPAN IMS layer can apply rules and policies related to the owner of the line (in-use LID) and the user of the line (Visiting LID).

It will be appreciated by persons skilled in the art that various modifications may be made to the above described embodiments without departing from the scope of the present invention. For example, the invention has been described in terms of a fixed line access network. However, the invention could, for example, apply to access using a Wireless Local Area Network (WLAN). In this case, the Service Set Identifier (SSID) that differentiates one WLAN from another WLAN could be used in place of a LID.

The invention claimed is:

1. A method of authenticating a terminal in an IP Multimedia Subsystem (IMS) network node, wherein the terminal has a registered Line Identifier (LID) stored in the IMS network and the terminal requests access to the IMS network using a third party's fixed-line broadband connection having an in-use LID different from the terminal's registered LID, the method comprising:

receiving by the IMS network node from an access network, an access request including the in-use LID and a terminal identifier for the terminal;

retrieving by the IMS network node from a database, the registered LID associated with the terminal, and a list of alternative authentication methods allowed for the terminal;

determining by the IMS network node, that the in-use LID received in the access request does not match the terminal's registered LID;

in response to determining that the in-use LID received in the access request does not match the terminal's registered LID, selecting from the list by the IMS network node, an alternative authentication method for authenticating the terminal; and performing by the IMS network node, the selected alternative authentication method for the terminal.

2. The method according to claim 1, wherein the selecting step includes selecting the alternative authentication method based on criteria selected from:

a user preference;
an operator preference;
a network domain;
a security preference; and
an access technology.

3. The method according to claim 1, further comprising accessing the access network via an http proxy.

4. A method of authenticating a user terminal in an access network providing access to an IP Multimedia Subsystem (IMS) network, wherein the user terminal has a registered Line Identifier stored in the access network and the user terminal requests access using a third party's fixed-line broadband connection having an in-use Line Identifier different from the user terminal's registered Line Identifier, the method comprising:

receiving in the access network, an access request including the in-use Line Identifier and a terminal identifier for the user terminal;

authenticating the user terminal in the access network;
retrieving from an access network database, a pre-registered Line Identifier associated with the user terminal;
determining by the access network that the pre-registered Line Identifier does not match the in-use Line Identifier;
generating from the in-use Line Identifier a Visiting Line Identifier in response to determining that the pre-registered Line Identifier does not match the in-use Line Identifier; and
sending the Visiting Line Identifier from the access network to the IMS network.

5. The method according to claim 4, further comprising:
determining by the IMS network that the Visiting Line Identifier received from the access network does not match the pre-registered Line Identifier; and
authenticating the user terminal in the IMS network even though the Vision Line Identifier does not match the pre-registered Line Identifier.

6. The method according to claim 5, wherein the step of generating the Visiting Line Identifier includes generating a concatenated Line Identifier comprising the Visiting Line Identifier and the in-use Line Identifier.

7. The method according to claim 6, further comprising:
deconcatenating the concatenated Line Identifier into the Visiting Line Identifier and the in-use Line Identifier; and
using the in-use Line Identifier for any one of
authorizing the user in the IMS network;
determining the geographical location of the user;
triggering Initial Filter Criteria relating to a user session; and
elaborating statistics relating to users of the IMS network using a Visiting Line Identifier.

8. A node for use in an IP Multimedia Subsystem (IMS) network, the node comprising a processor coupled to a non-transitory memory for storing computer program instructions, wherein when the processor executes the computer program instructions, the processor causes the node to:
receive from a access network, an access request including an in-use access identifier and a terminal identifier associated with a user terminal;
retrieve from a database, a registered access identifier associated with the user terminal, and a list of alternative authentication methods allowed for the user terminal;
determine whether the received in-use access identifier matches the registered access identifier;
authenticate the user terminal in the IMS network when the received in-use access identifier matches the registered access identifier; and
perform an alternative authentication method selected from the list when the received access identifier does not match the registered access identifier.

9. The node according to claim 8, wherein the node is a Call Session Control Function.

10. The node according to claim 8, wherein the in-use access identifier received from the access network is selected from an in-use Line Identifier and a Service Set Identifier.

11. A node for use in an access network providing access to an IP Multimedia Subsystem (IMS) network, the node comprising a processor coupled to a non-transitory memory for storing computer program instructions, wherein when the processor executes the computer program instructions, the processor causes the node to:
receive an access request including an in-use Line Identifier and a terminal identifier associated with a user terminal;
authenticate the user terminal in the access network;
retrieve from a database, a pre-registered Line Identifier associated with the user terminal;
determine that the received in-use Line Identifier does not match the pre-registered Line Identifier;
generate from the in-use Line Identifier a Visiting Line Identifier in response to determining that the received in-use Line Identifier does not match the pre-registered Line Identifier; and
send the Visiting Line Identifier to the IMS network.

12. The node according to claim 11, wherein the node is a Connectivity Session Location and Repository Function.

* * * * *

UNITED STATES PATENT AND TRADEMARK OFFICE
CERTIFICATE OF CORRECTION

PATENT NO. : 8,578,456 B2
APPLICATION NO. : 12/515652
DATED : November 5, 2013
INVENTOR(S) : Lindholm et al.

It is certified that error appears in the above-identified patent and that said Letters Patent is hereby corrected as shown below:

In the Claims

In Column 9, Line 6, in Claim 4, delete "Identifier" and insert -- Identifier, --, therefor.

In Column 9, Line 17, in Claim 5, delete "Vision" and insert -- Visiting --, therefor.

In Column 9, Line 27, in Claim 7, delete "of" and insert -- of: --, therefor.

In Column 10, Line 33, in Claim 11, delete "Identifier" and insert -- Identifier, --, therefor.

Signed and Sealed this
Eleventh Day of March, 2014

Michelle K. Lee
*Deputy Director of the United States Patent and Trademark Office*